(12) United States Patent
Nguyen

(10) Patent No.: US 12,413,545 B1
(45) Date of Patent: Sep. 9, 2025

(54) DETERMINING WHETHER AN INCOMING COMMUNICATION IS A SPAM OR VALID COMMUNICATION

(71) Applicant: T-Mobile USA, Inc., Bellevue, WA (US)

(72) Inventor: Phi Hoang Nguyen, Lacey, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/601,876

(22) Filed: Mar. 11, 2024

(51) Int. Cl.
*H04L 51/224* (2022.01)
*H04L 51/212* (2022.01)
*H04L 51/222* (2022.01)

(52) U.S. Cl.
CPC .......... *H04L 51/224* (2022.05); *H04L 51/212* (2022.05); *H04L 51/222* (2022.05)

(58) Field of Classification Search
CPC .... H04L 51/224; H04L 51/212; H04L 51/222
See application file for complete search history.

(56) References Cited

U.S. PATENT DOCUMENTS

| | | |
|---|---|---|
| 7,257,401 B1 | 8/2007 | Dizdarevic et al. |
| 7,386,517 B1 | 6/2008 | Donner |
| 7,450,934 B2 | 11/2008 | Caspi et al. |
| 7,647,164 B2 | 1/2010 | Reeves |
| 7,996,005 B2 | 8/2011 | Lotter et al. |
| 8,000,689 B2 | 8/2011 | Featherstone et al. |
| 8,037,511 B1 | 10/2011 | Lundy et al. |
| 8,046,420 B2 | 10/2011 | Pan |
| 8,126,456 B2 | 2/2012 | Lotter et al. |
| 8,144,644 B1 | 3/2012 | Mohan et al. |
| 8,160,556 B2 | 4/2012 | Gosselin et al. |
| 8,176,531 B2 * | 5/2012 | Katsikas .............. H04L 51/212 726/3 |
| 8,204,073 B1 | 6/2012 | Gailloux et al. |
| 8,224,334 B1 | 7/2012 | White et al. |
| 8,230,026 B2 | 7/2012 | Gilhuly et al. |
| 8,284,682 B2 | 10/2012 | Huq et al. |

(Continued)

FOREIGN PATENT DOCUMENTS

| | | |
|---|---|---|
| CN | 102640525 B | 12/2016 |
| EP | 2618549 B1 | 4/2014 |

(Continued)

*Primary Examiner* — Caroline H Jahnige
(74) *Attorney, Agent, or Firm* — Perkins Coie LLP

(57) ABSTRACT

The system receives a request for communication from an originator UE. The request for communication includes a unique identifier of the originator UE and a unique identifier of a receiver UE. The system obtains profile information of the originator UE including a name or a region of the originator UE. The system obtains profile information of the receiver UE including a communication history or calendar entry of the receiver UE. Based on the profile information of the originator UE and the receiver UE, the system determines whether the communication is spam. If the communication is valid, the system routes the communication to the originator UE. If the communication is spam, the system indicates to the receiver UE that there is an incoming communication that is likely spam. The system stores in a database the unique identifier of the originator UE and the determination of whether the communication is spam.

20 Claims, 9 Drawing Sheets

(56) References Cited

U.S. PATENT DOCUMENTS

| | | |
|---|---|---|
| 8,315,606 B2 | 11/2012 | Gisby et al. |
| 8,380,165 B1 | 2/2013 | Koller et al. |
| 8,380,178 B1 | 2/2013 | Dreiling et al. |
| 8,392,357 B1* | 3/2013 | Zou ............... H04L 51/212 |
| | | 715/752 |
| 8,477,941 B1 | 7/2013 | Dhanoa et al. |
| 8,478,306 B2 | 7/2013 | Zheng |
| 8,484,344 B2 | 7/2013 | Butterfield et al. |
| 8,880,045 B2 | 11/2014 | Balan et al. |
| 8,892,136 B2 | 11/2014 | Bobotek |
| 8,924,488 B2 | 12/2014 | Bobotek |
| 9,060,253 B2 | 6/2015 | Cooper et al. |
| 9,100,831 B2 | 8/2015 | Bendi et al. |
| 9,560,495 B2 | 1/2017 | Appelman |
| 9,572,000 B2 | 2/2017 | Gupta |
| 9,600,805 B2 | 3/2017 | Lange et al. |
| 9,654,952 B2 | 5/2017 | Nasir et al. |
| 9,763,166 B2 | 9/2017 | Hyde et al. |
| 9,787,545 B2 | 10/2017 | Hyde et al. |
| 9,818,133 B1 | 11/2017 | Bell et al. |
| 9,826,401 B2 | 11/2017 | Carames et al. |
| 9,832,728 B2 | 11/2017 | Hyde et al. |
| 9,854,089 B1 | 12/2017 | Conway |
| 9,860,686 B2 | 1/2018 | Flynn et al. |
| 9,894,509 B2 | 2/2018 | Nacer et al. |
| 9,913,111 B2 | 3/2018 | Chien |
| 9,923,622 B2 | 3/2018 | Jactat et al. |
| 9,924,347 B1 | 3/2018 | Chastain et al. |
| 9,942,710 B2 | 4/2018 | Dowlatkhah et al. |
| 9,967,241 B2 | 5/2018 | Raman et al. |
| 9,973,920 B2 | 5/2018 | Brinskele |
| 9,973,922 B1 | 5/2018 | Yamamoto et al. |
| 11,070,642 B2 | 7/2021 | Sankaranarayanan et al. |
| 11,159,936 B2 | 10/2021 | Wang et al. |
| 2003/0105827 A1* | 6/2003 | Tan ............... H04M 3/436 |
| | | 709/206 |
| 2004/0066920 A1 | 4/2004 | Vandermeijden |
| 2005/0059384 A1 | 3/2005 | Kuusinen et al. |
| 2005/0130631 A1 | 6/2005 | Maguire et al. |
| 2005/0249172 A1 | 11/2005 | Malik |
| 2008/0242293 A1 | 10/2008 | Gosselin |
| 2009/0150218 A1 | 6/2009 | Brunner et al. |
| 2010/0151868 A1 | 6/2010 | Shinozaki |
| 2011/0014923 A1 | 1/2011 | Krco et al. |
| 2011/0038287 A1 | 2/2011 | Agarwal et al. |
| 2011/0086623 A1 | 4/2011 | Harmon et al. |
| 2011/0159878 A1 | 6/2011 | Bender et al. |
| 2011/0269422 A1 | 11/2011 | Xu et al. |
| 2011/0269472 A1 | 11/2011 | Xu et al. |
| 2012/0225634 A1 | 9/2012 | Gee et al. |
| 2012/0259929 A1* | 10/2012 | Vitaldevara ........... H04L 51/212 |
| | | 709/206 |
| 2013/0244623 A1 | 9/2013 | Cudak et al. |
| 2023/0284012 A1 | 9/2023 | Voruganti et al. |
| 2023/0328522 A1 | 10/2023 | Shah |
| 2023/0354029 A1 | 11/2023 | Ahmet |
| 2023/0362583 A1 | 11/2023 | Rahman |
| 2023/0362619 A1 | 11/2023 | Arends et al. |
| 2023/0379047 A1 | 11/2023 | Bashir |
| 2023/0403544 A1 | 12/2023 | Brooks |

FOREIGN PATENT DOCUMENTS

| | | |
|---|---|---|
| EP | 1840511 B1 | 3/2016 |
| EP | 2880913 B1 | 8/2019 |
| EP | 2564608 B1 | 11/2019 |
| EP | 3202172 B1 | 6/2023 |
| JP | 6530562 B2 | 6/2019 |
| JP | 2019134355 A | 8/2019 |
| JP | 2020500483 A | 1/2020 |
| KR | 20150074030 A | 7/2015 |
| WO | 2013177210 A1 | 11/2013 |
| WO | 2016063272 A1 | 4/2016 |
| WO | 2016076628 A2 | 5/2016 |
| WO | 2017190753 A1 | 11/2017 |
| WO | 2020089590 A1 | 5/2020 |
| WO | 2021186331 A1 | 9/2021 |
| WO | 2023059238 A1 | 4/2023 |

* cited by examiner

DETERMINING WHETHER AN INCOMING COMMUNICATION IS A SPAM OR VALID COMMUNICATION

BACKGROUND

Cyber threats remain a central concern for organizations of all sizes, with such threats extending their reach beyond companies to include individuals without any organizational affiliation. Hacking has evolved into a lucrative business endeavor, primarily focused on maximizing profits through the theft of money and sensitive personal data, which is subsequently used to impersonate victims for financial gain. As these threats become increasingly sophisticated and new hacking techniques constantly emerge, ordinary users find it challenging to distinguish genuine security threats from fake threats.

With the proliferation of generative artificial intelligence (GenAI), experts anticipate a surge in intrusion attacks exploiting factors such as scale, speed, sophistication, and precision, with a continuous influx of novel threats on the horizon. When assessing both the likelihood and the potential impact, autonomous attacks conducted at a large scale stand out as the most significant risk to both businesses and individuals.

BRIEF DESCRIPTION OF THE DRAWINGS

Detailed descriptions of implementations of the present invention will be described and explained through the use of the accompanying drawings.

Figure 1:
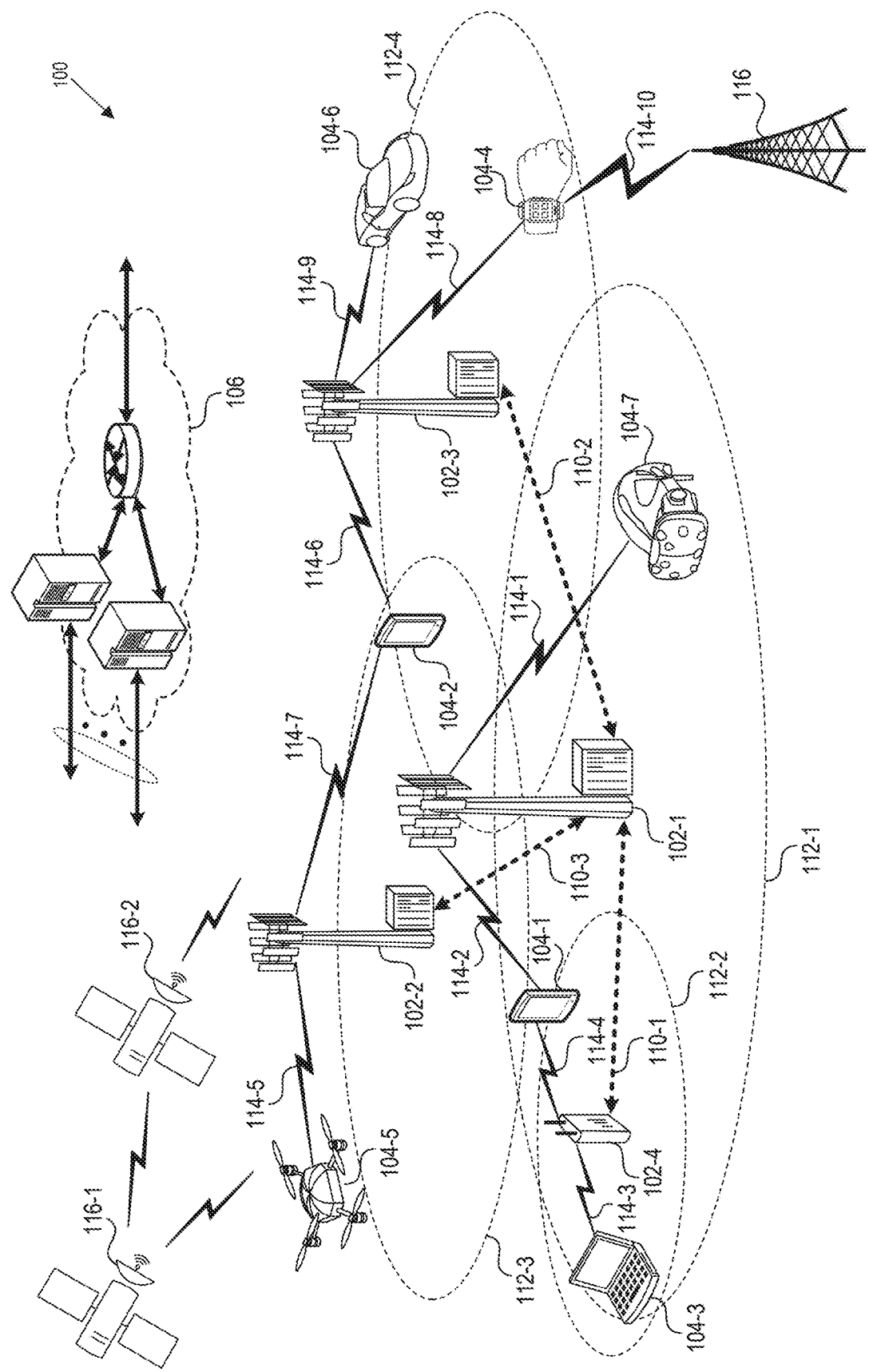
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system enables a UE to determine whether the UE should trust a received message. The system can filter out or block irrelevant content, using intelligent content detection, categorization, and tagging directly at the consumer device level. The system ensures that messages are sorted into the appropriate categories, allowing a user of the UE to take appropriate actions.

The system can utilize LLMs and GenAI that are operating on the wireless telecommunication network, such as at the network power level or at the core network, thus harnessing significantly higher computing power compared to UEs. Alternatively, lighter versions of LLMs and GenAIs can also operate on the UE, aiding a notification of spam communication. The LLM and the GenAI can provide additional information, for example in the form of metadata, to enable the system to determine whether the communication is spam. When combined with user-specific data such as contacts, calendars, outbound history, and personal content, the system can more accurately determine whether the incoming communication is spam and can act accordingly.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
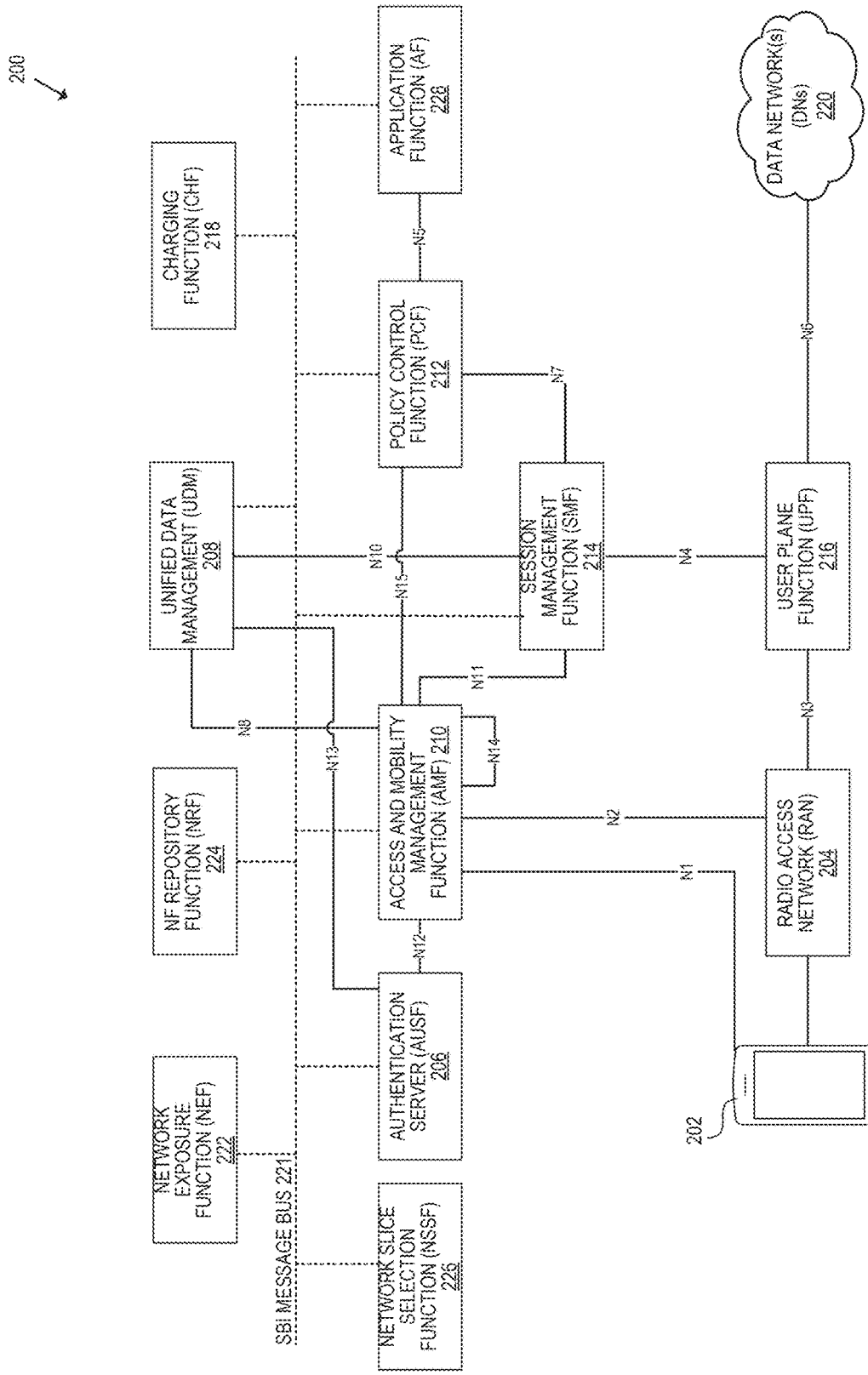
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, off-loading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Determining Whether an Incoming Communication is a Spam or Valid Communication

Figure 3:
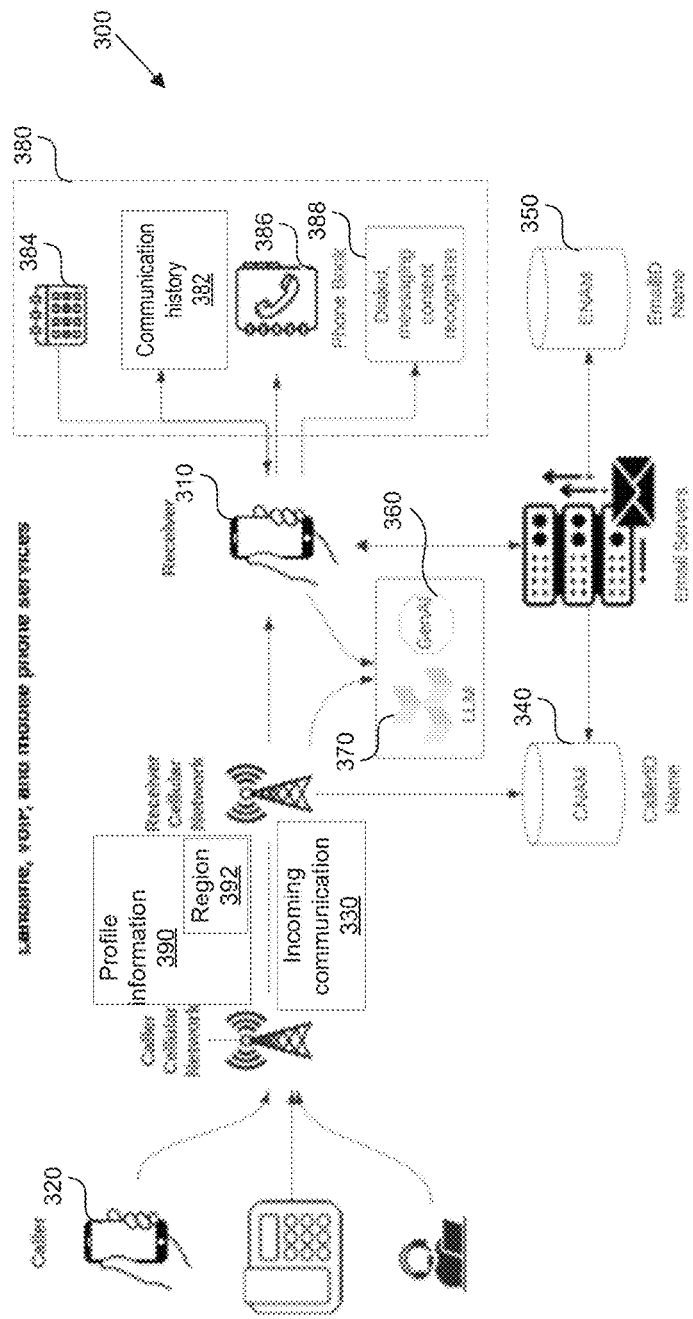
FIG. 3 is an overview of the system to detect spam communication.

FIG. 3 is an overview of the system to detect spam communication. Spam communication can include data breaches, privacy invasion, financial fraud, ransomware, identity theft, corporate espionage, data loss, network intrusions, phishing, and/or cybersecurity negligence, as explained below.

Data breaches can lead to the exposure of users' personal data, which might include social security numbers, addresses, and more.

In privacy invasion, some applications and websites might collect a user's data without the user's knowledge or consent. They can track the user's online behavior, which websites the user visits, what the user purchases, and more. This invasion of privacy can lead to targeted advertising, where the user's personal data is exploited to manipulate the user's choices.

In financial fraud, cybercriminals can use phishing emails or malicious websites to trick the user into revealing financial information such as credit card numbers, bank account details, or login credentials for online banking. The cybercriminals can then use this information to steal the user's money or engage in fraudulent activities.

Ransomware is a type of malware that can infect the user's UE. Ransomware can encrypt the user's data and demand a ransom for its release. Falling victim to ransomware can lead to significant financial losses, as well as potential data loss if the user doesn't pay the ransom.

In identity theft, cybercriminals can use the user's stolen personal information to impersonate the user, to open accounts, to make purchases, or to commit crimes in the user's name. This can severely damage the user's credit score and financial stability.

In corporate espionage, competing businesses or even nation-states can target each other to steal proprietary information, financial data, or intellectual property. This can lead to significant financial losses, damage to reputation, and legal issues.

In data loss, the user's personal data, as well as critical company assets, can be lost due to cyberattacks, hardware failures, or accidents. If the data is not properly backed up, the loss of this data can be devastating.

In network intrusions, hackers can infiltrate company networks, gaining access to sensitive information and potentially disrupting operations. This can compromise customer data, trade secrets, and confidential information.

Phishing attacks involve fraudulent emails or websites that impersonate trusted entities to trick users into revealing personal or corporate data. Falling for phishing schemes can have dire consequences for individuals and companies alike.

Cybersecurity negligence includes failing to maintain strong passwords, neglecting software updates, and not using adequate security measures. Cybersecurity negligence can make both individuals and companies more vulnerable to cyber threats.

The system 300 can provide a receiver UE 310 with enhanced metadata about an originator UE 320 that originates a communication 330. With a richer context, the receiver UE 310 can take automatic actions to prevent unnecessary data exposure or offer users a better understanding of incoming communications 330 before the user decides how to respond. Incoming communications 330 can be phone calls, text messages, social media posts, emails, etc.

To prevent spam communication, the system 300 can include a database 340, e.g., caller name (CNAM) database, and a database 350, e.g., email name (ENAM) database. The database 340 can map the unique identifier 342 of the originator UE 320 initiating a call, such as a phone number, to a name 344 associated with the originator UE 320, and/or to a type 346 associated with the originator UE 320. The type 346 can be individual, business, or unknown. The name 344 can be the name of a business, name of an individual, etc.

The database 350 can map the unique identifier 352 of the originator UE 320 initiating an email, such as an email address, to a name 354 associated with the email address and/or to a type 356 associated with the originator UE 320. The type 356 can be individual, business, or unknown. The name 354 can be the name of a business, name of an individual, etc. Currently, the database 350, mapping emails to names, that is accessible to the network 100 in FIG. 1 does not exist.

The system 300 can integrate GenAI 360 and LLM 370 to identify the caller's phone number, the caller's email, and any associated metadata, as described in this application. GenAI 360 and LLM 370 can run at the network 100 level, or can run on the receiver UE 310. LLM 370 can recognize unique identifier 342, 352 patterns associated with known hackers and spam communication originators, which users typically do not know. GenAI 360 can then recommend actions based on the data provided by LLM 370 to improve the subsequent phases of the phone and messaging handoff process. This newly acquired data can be used to tag the originator UE 320 that was previously unknown to the databases 340, 350, allowing the network 100 to identify these initiators more quickly when receiving similar network requests in the future.

The system 300 can collect profile information 380 associated with the receiver UE 310 to complement profile information 390 received from the network 100. The profile information 390 can be profile information associated with the originator UE 320 including the unique identifier 342, 352 associated with the originator UE 320 and a region 392 associated with the originator UE 320. The profile information 380 associated with the receiver UE 310 can include a communication history 382 associated with the receiver UE 310, a calendar entry 384 associated with the receiver UE 310, a phone book 386 associated with the receiver UE 310, and message content 388 associated with the receiver UE 310. The phone book 386 can be the contact list associated with the receiver UE 310.

For example, to determine whether a communication 330 is spam or valid communication, the system 300 can determine whether the receiver UE 310 has communicated with the originator UE 320 previously, based on the communication history 382. If so, the communication 330 is likely to be a valid communication.

In another example, the system 300 can utilize the phone book 386 and the calendar entry 384 to determine whether the communication 330 is spam or valid. For example, if the unique identifier associated with the originator UE 320 is in the phone book, the system 300 can increase the likelihood that the incoming communication 330 is valid. If the unique identifier associated with the originator UE 320 is associated with the calendar entry 384, such as an upcoming appointment, the system 300 can increase the likelihood that the incoming communication 330 is valid. Specifically, the user may have a dentist appointment, and can be receiving a call from the dentist's office. The system 300 can identify this communication as being valid communication.

Figure 4:
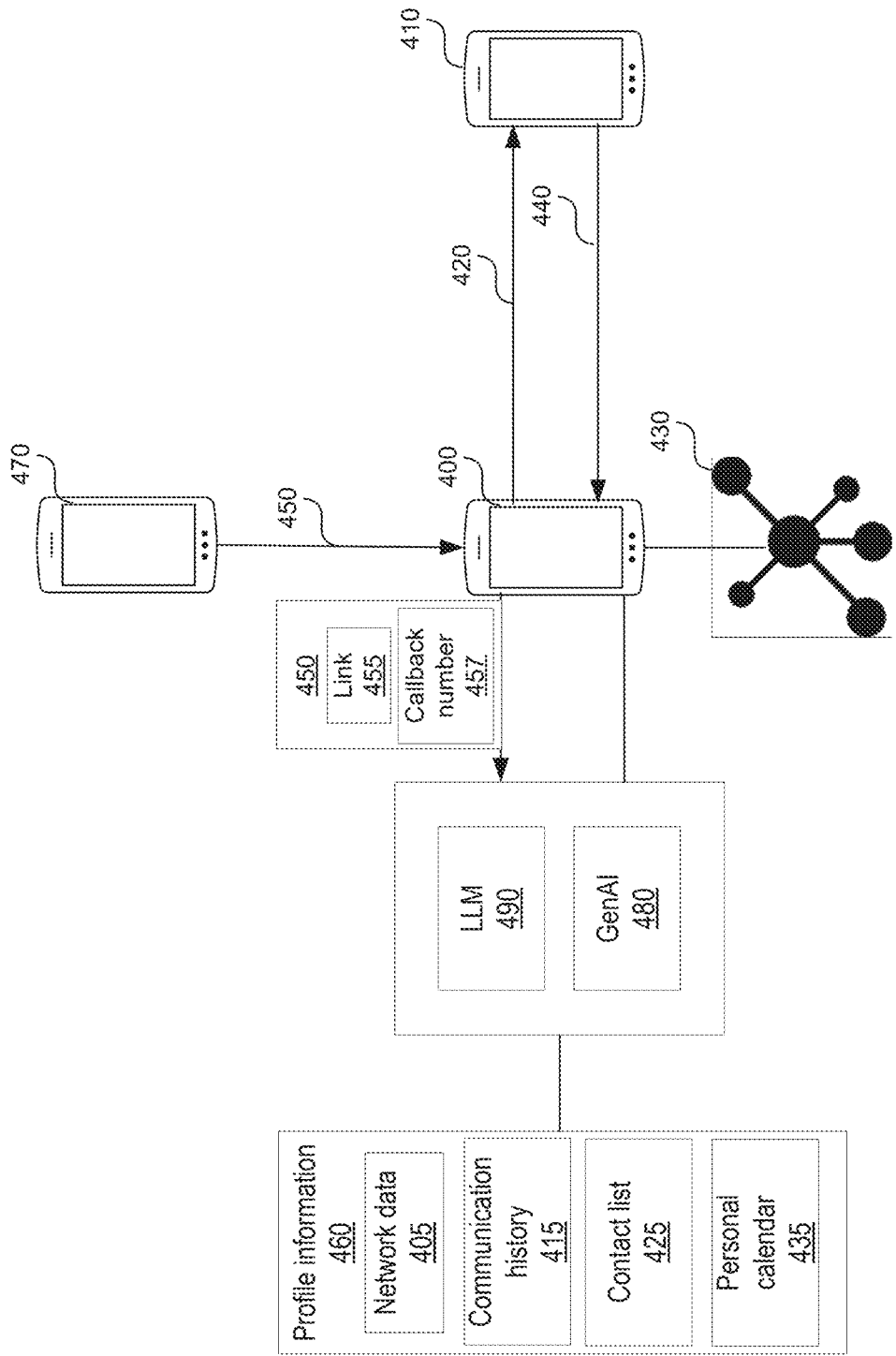
FIG. 4 shows interaction between the receiver user equipment (UE), the large language model (LLM), and the GenAI.

FIG. 4 shows interaction between the receiver UE, the LLM, and the GenAI. The UE 400 can belong to an individual user, or can be a part of a business. The UE 400 can detect and recognize contacts in inbound calls or messages. The UE 400 can initiate a communication 420 to a UE 410. The UE 400 can record the phone number or the email associated with the communication 420, designating the UE 410 as a trusted contact and as part of a trust network 430. The contacts in the trust network 430 can be stored on the UE 400 or in the network 100 in FIG. 1 in a database associating the trust network 430 with the UE 400. In the future, when the UE 400 receives a communication 440, from the UE 410, the UE 400 can identify the communication 440 as a valid communication.

When the UE 400 receives an incoming communication 450, the GenAI 480 and LLM 490 can obtain communication history 415 including call history, email history, text history, and/or social media post history to determine frequency of communication between the UE 470 originating the communication 450 and the UE 400. Upon determining that the frequency of communication between the originator UE and the receiver UE is below a first threshold, such as never, the GenAI 480 and LLM 490 can increase the likelihood that the communication 450 is a spam communication.

The system 300 in FIG. 3 can execute the GenAI 480 and LLM 490 on the network 100, or on the UE 400. Recognizing that the UE 400 may not match the computational power of servers hosted on the network 100, the GenAI 480 and LLM 490 can be optimized and tailored for smaller devices while retaining the capacity to handle contact detection tasks.

The LLM 490 can recognize the phone and email patterns associated with the originator device such as the UE 470. If the LLM 490 identifies a contact name from profile information 460 of the UE 400 including network data 405 (e.g., metadata stored in the network 100 in FIG. 1), communication history 415, contact list 425, and personal calendar 435, the LLM 490 can forward the contact to the GenAI 480, including the message content, to solicit feedback on whether the contact is trustworthy. The GenAI 480 can generate a recommendation to the user regarding whether to engage in the received communication.

If the LLM 490 and GenAI 480 determine that the communication 450 is a valid communication and trustworthy, the system 300 can send the communication 450 to the receiver UE 400, and provide additional information about the originator device UE 470, such as the name associated with the originator device.

If the LLM 490 and GenAI 480 determine that the communication 450 is a spam communication and not trustworthy, the system 300 can offer various options, such as routing the call to voicemail automatically or flagging the messaging conversation as a potential scam alert, with additional alerting context.

The LLM 490 and GenAI 480 can determine whether the communication 450 contains a link 455 or a callback number 457 that poses potential threats to user privacy and financial security. If so, the system 300 can remove the link 455 and/or the callback number 457 from the communication 450. In addition, the system 300 can provide notification to the authorities, and to the trust network 430 for future pattern recognition.

The trust network 430 can be associated with the originator UE 470 or the receiver UE 400. For example, when the trust network 430 is associated with the receiver UE 400, and the unique identifier associated with the originator UE 470 belongs to the trust network 430 of the receiver UE 400, the system 300 can determine that the incoming communication 450 is valid. In another example, the trust network 430 can be associated with the originator UE 470, where multiple senders belong to the same organization. In that case, the system 300 can determine the trustworthiness of the originator UE 470 by determining whether the UE 470 belongs to an organization that has a relationship with the receiver UE 400. For example, a different person in the organization can send a response to a query from the UE 400.

The system 300 can determine the likelihood that the communication 450 is a valid communication based on a region from which the communication 450 is placed, and last known location of a UE and the trust network 430. Even if the UE 470 placing the communication 450 has never been in touch with the UE 400, the system 300 can still increase the likelihood that the communication 450 is not a spam communication, and can take appropriate action. For example, the system 300 can provide the region from which the communication 450 is placed and the last known location of the UE in the trust network 430 to the UE 400, and let the user of the UE 400 decide whether to accept the communication 450. In addition, the system can provide the computed likelihood that the communication 450 is not a spam communication to the UE 400.

The system 300 can obtain an indication of urgency of the communication 450. The UE 470 originating the communication 450 can indicate the urgency of the communication 450, or the system 300 can analyze the content of the communication 450 to determine whether the communication 450 is urgent. If the UE 470 originating the communication 450 is part of the trust network 430, for example the UE 470 belongs to one of the children in the trust network, the system 300 can determine that the communication is a valid communication, and in addition, the system 300 can send the message to the receiver UE 400, e.g., the mom's UE, as well as to another UE 400, e.g., the dad's UE. The UEs in the trust network 430 can be UEs associated with the same plan on the network 100 in FIG. 1.

In another example, if the system 300 obtains an urgent communication 450 from the UE in the trust network 430, directed to the receiver UE 400, but the UE 400 is moving above a predetermined speed threshold, such as 30 miles an hour, the system 300 can cause the UE 400 to automatically receive the communication 450. In addition, the system 300 can determine that the receiver UE 400 is in a vehicle, and the system 300 can route the vehicle to the location of the UE 470 originating the urgent communication 450.

Figure 5A:
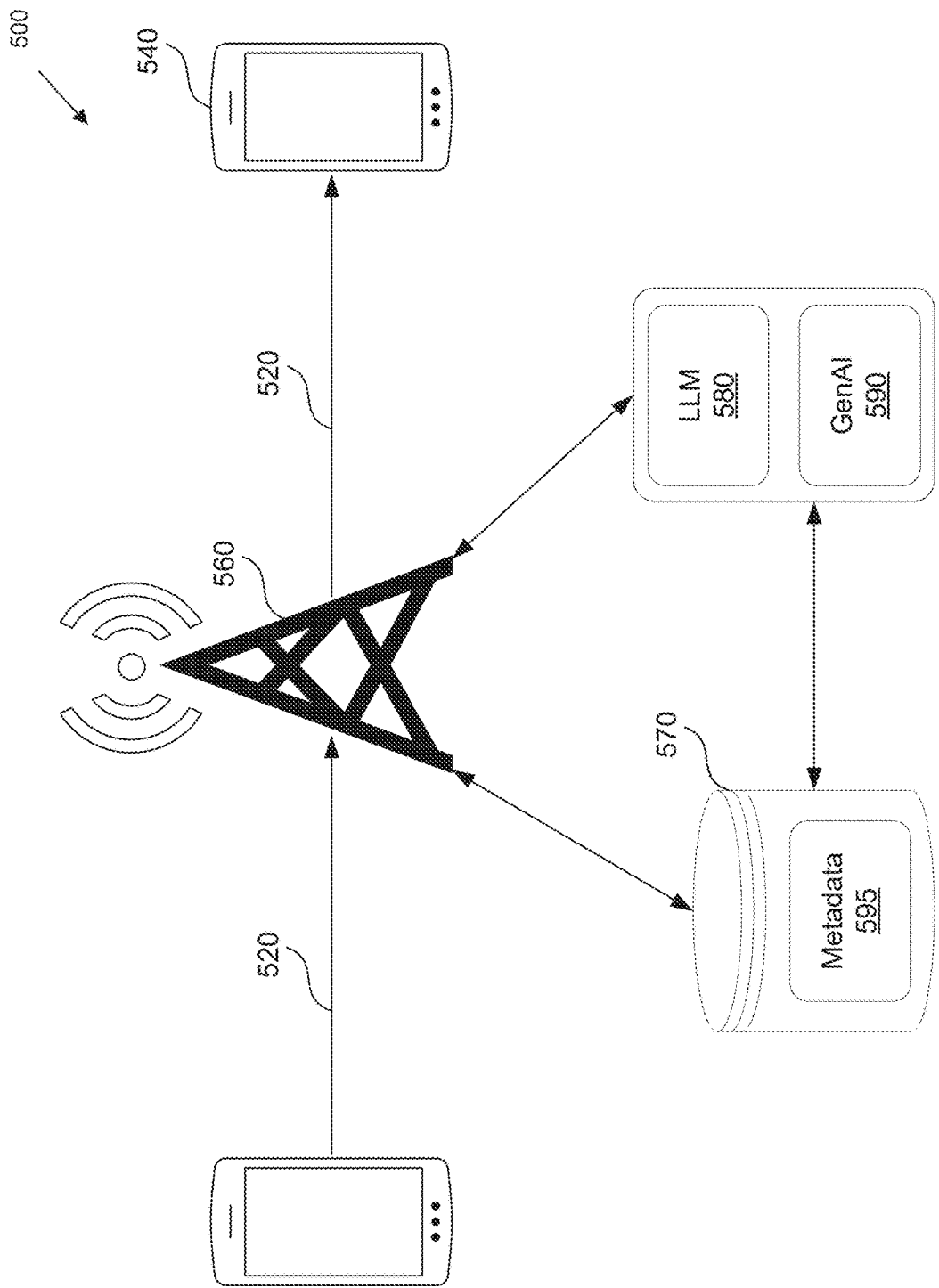
FIGS. 5A-5B address two distinct use cases including voice/messaging conversations and email, respectively.
Figure 5B:
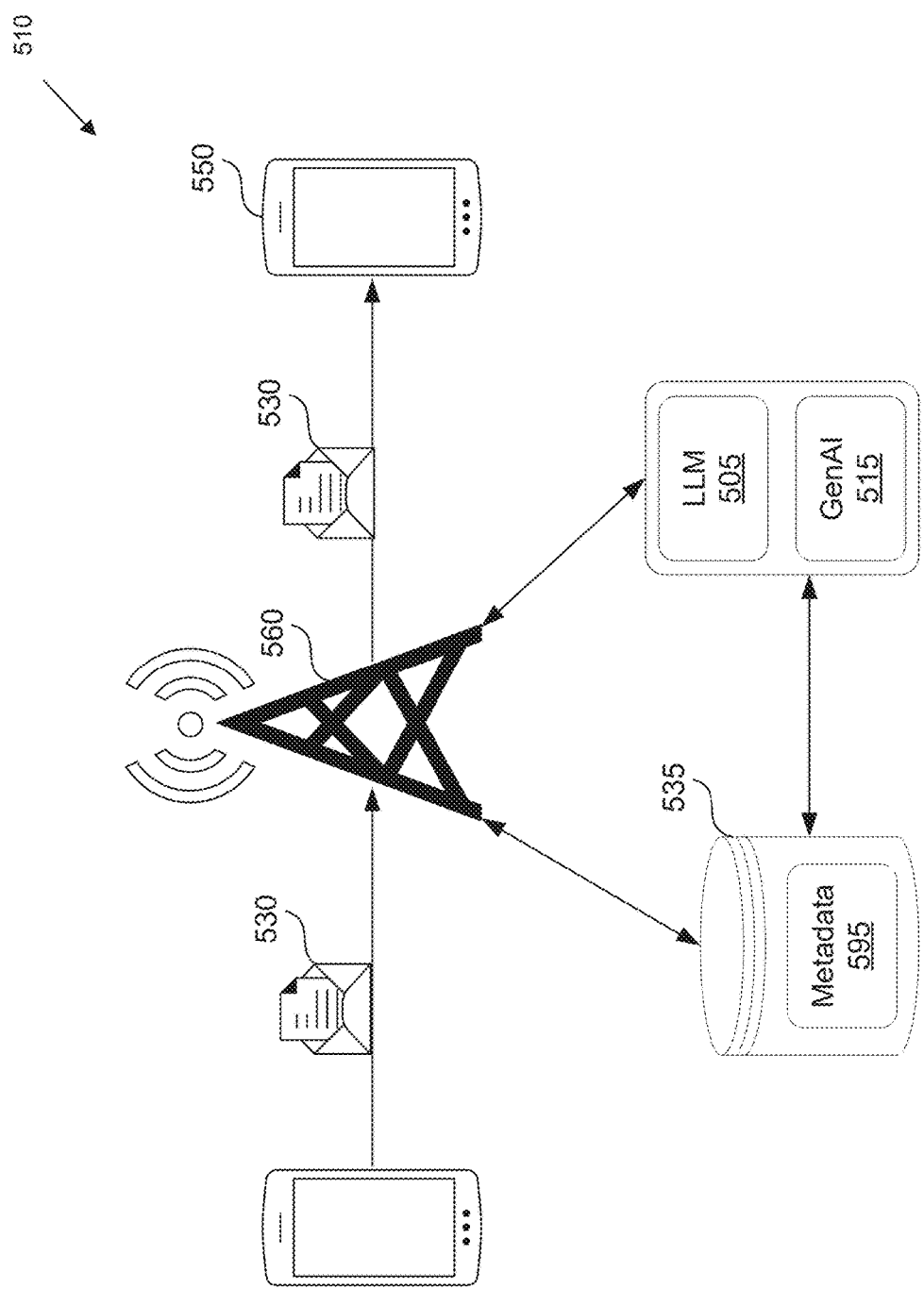

FIGS. 5A-5B address two distinct use cases including voice/messaging conversations and email, respectively. In both cases, the system 500, 510 can recognize the initiator of the communication 520, 530 before the communication is forwarded to the UE 540, 550.

In FIG. 5A, representing voice and messaging, when the communication 520 reaches the network tower 560, the network tower 560 can query the caller name (CNAM) database 570 to retrieve the contact name associated with the phone number of the originator UE 540. If a contact is found, both the phone number and the contact name are sent to the LLM 580 to seek additional contextual information from a global database. If relevant information is discovered, the system 500 can update the CNAM database 570, ensuring recognition of this contact in the future. The LLM 580 can relay the output to the GenAI 590 for further recommendations such as whether to trust this phone number, along with any additional metadata 595 related to the contact, such as an organization associated with the phone number, recent frequency or number of spam communications associated with the phone number, etc.

To include additional metadata related to the contact, the CNAM database 570 is modified, compared to the current standard, to extend the 15-character limit of CNAM record to 30 characters. The longer record allows for the inclusion of additional contextual information, e.g., metadata 595.

FIG. 5B shows that a process similar to the process shown in FIG. 5A can be applied to decode contact information from email addresses. This involves leveraging LLM 505 and GenAI 515 for pattern recognition and subsequent recommendations. Given the absence of an industry-wide email-to-contact deduplication standard, the system 510 introduces a new standard that establishes a global ENAM database 535. The system 510 enables email servers to query the ENAM database 535 before handing off email communications 530 to recipient UE 550. The system 510 provides a unified solution for email processing, akin to the way the system 500 handles voice and messaging communications 520.

Figure 6:
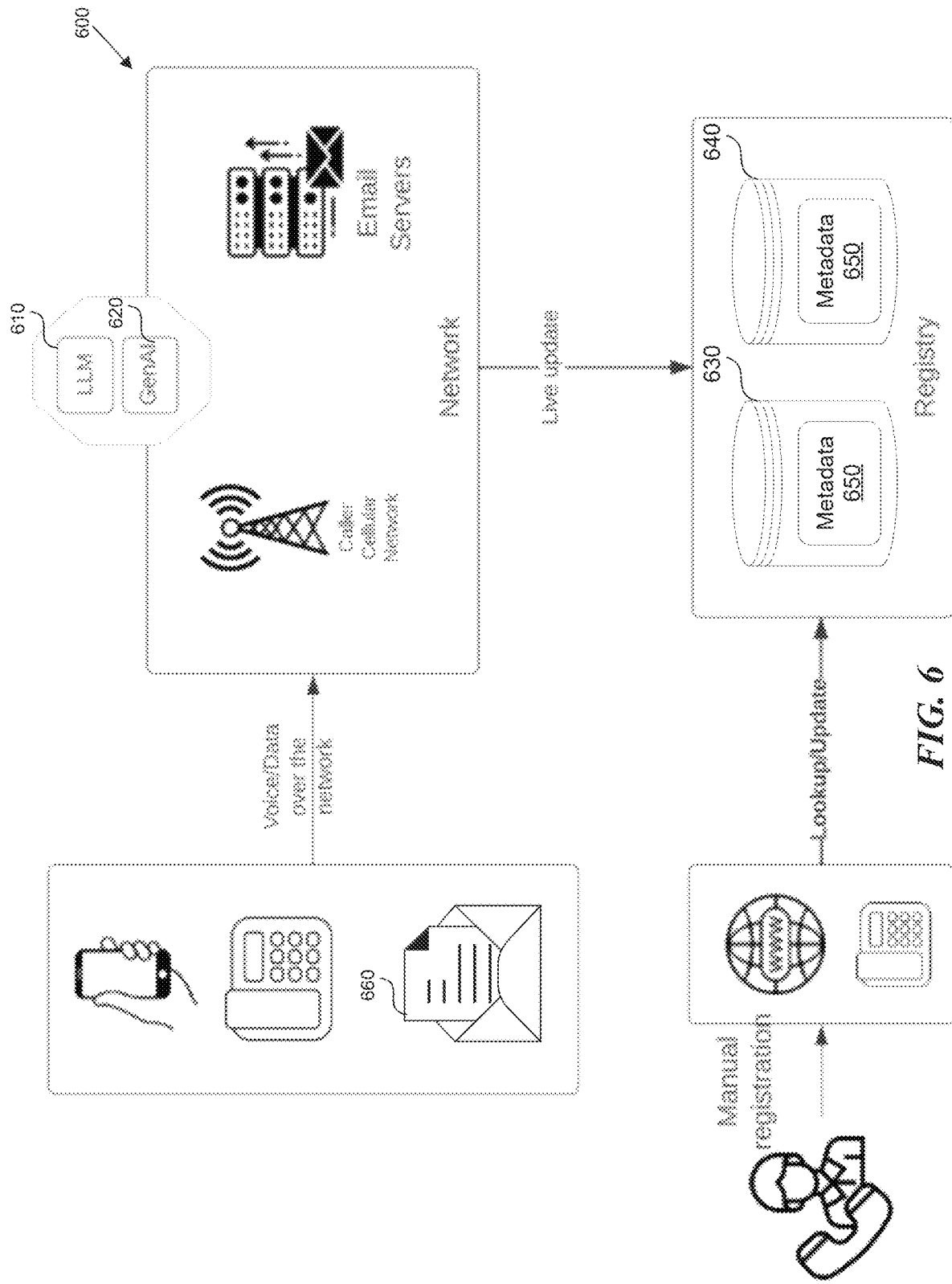
FIG. 6 illustrates the process of automatically registering a contact in the global caller name (CNAM) and email name (ENAM) registries.

FIG. 6 illustrates the process of automatically registering a contact in the global CNAM and ENAM registries. Currently, individuals and businesses can manually update their contacts with telephone providers. The system 600 extends this mechanism to include email contacts 660, which is a novel addition to the existing standards.

The manual process alone cannot overwrite all phone numbers and emails, especially with bad actors who may resist having their mapping updated. The system 600 utilizes LLM 610 and GenAI 620 to tag any UEs operating on the network 100 in FIG. 1. The tags can be stored as metadata 650, as described in this application, in CNAM database 630 and ENAM database 640. All UEs operating on the network 100 can use the stored metadata 650 to determine whether the incoming communication is a spam communication or a valid communication.

By leveraging advanced technology for tagging, the system 600 can adapt more rapidly to the evolving landscape of our society, including cybersecurity threats like hacking events. Furthermore, the system 600 can take proactive measures to mitigate potential impacts to the network 100 before such events occur. In doing so, the system 600 not only limits the scope of potential damage but also has the potential to prevent these impacts from happening in the first place. Effectively, the system 600 can create a more secure and adaptive system to combat cyber threats and protect the integrity of global contact information registries.

Figure 7:
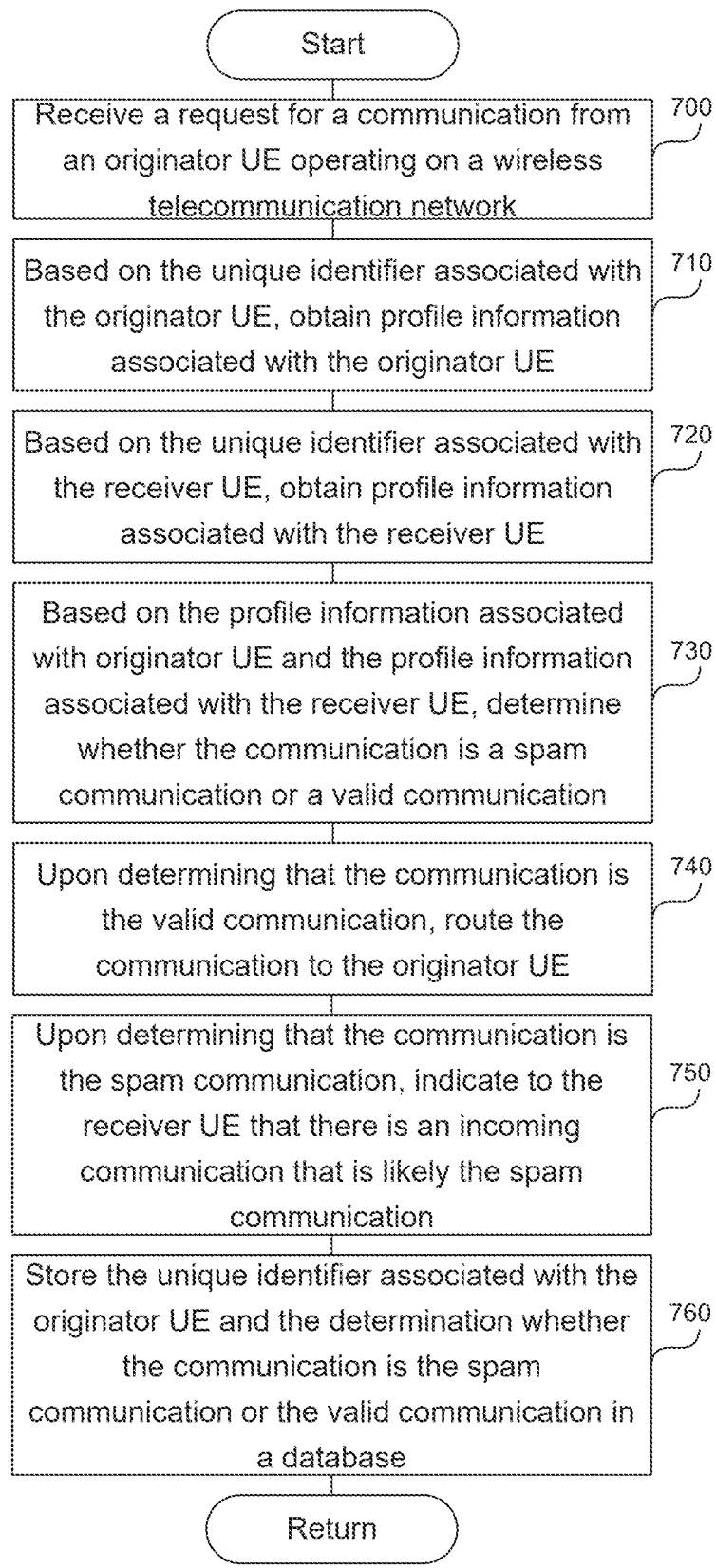
FIG. 7 is a flowchart of a method to determine whether an incoming communication is a spam communication or a valid communication.

FIG. 7 is a flowchart of a method to determine whether an incoming communication is a spam communication or a valid communication. A hardware or software processor executing instructions described in this application can, in step 700, receive a request for a communication from an originator UE operating on a wireless telecommunication network, where the request for the communication includes a unique identifier associated with the originator UE and a unique identifier associated with a receiver UE operating on the wireless telecommunication network. The communication can be a call, a text message, a social media post, a social media message, an encrypted message, etc.

In step 710, based on the unique identifier associated with the originator UE, the processor can obtain profile information associated with the originator UE including a name associated with the originator UE or a region associated with the originator UE.

In step 720, based on the unique identifier associated with the receiver UE, the processor can obtain profile information associated with the receiver UE including a communication history associated with the receiver UE, a calendar entry associated with the receiver UE, and/or a phone book, e.g., a contact list, associated with the receiver UE.

In step 730, based on the profile information associated with the originator UE and the profile information associated with the receiver UE, the processor can determine whether the communication is a spam communication or a valid communication.

In step 740, upon determining that the communication is the valid communication, the processor can route the communication to the originator UE, and provide at least a portion of the profile information associated with the originator UE to the receiver UE. For example, the processor can provide the name associated with the originator UE, the last time of contact, and/or the region associated with the originator UE.

In step 750, upon determining that the communication is the spam communication, the processor can indicate to the receiver UE that there is an incoming communication that is likely the spam communication. If the processor determines that the communication is the spam communication, the processor can remove any embedded links or callback numbers from the spam communication.

In step 760, the processor can store the unique identifier associated with the originator UE and the determination of whether the communication is the spam communication or the valid communication in a database as metadata. The metadata can be retrieved by other UEs, especially UEs in a trust network, to determine whether the incoming call is spam. The database can be a CNAM database or an ENAM database, or some other database suitable for tracking spam communication.

The processor can create a trust network of UEs including the first UE and a second UE. Any communications received from UEs in the trust network are valid communications. In addition, a UE in the trust network can receive calls directed to another UE in the trust network. For example, a wife can have an appointment, and the husband can receive calls for her appointments. In addition, if a UE in the trust network is a spam communication from an originator UE, every other UE in the trust network is notified that any communication from the originator UE is likely spam communication.

Specifically, the processor can receive the communication indicating a first unique identifier associated with the first UE. The first UE may not be reachable for some reason, for example the first UE could be out of cell reception range. Alternatively, the first UE can include a setting requesting broadcasting of the communication to all the UEs in the trust network. The processor can obtain profile information associated with the first UE including a communication history associated with the first UE, a calendar entry associated with the first UE, and a phone book associated with the first UE. Based on the profile information associated with the originator UE and the profile information associated with the first UE, the processor can determine whether the communication is the spam communication or the valid communication. Upon determining that the communication is the valid communication based on the profile information associated with the first UE, the processor can route the communication to the second UE, thereby enabling the second UE to receive the valid communication directed to the first UE.

The processor can create the trust network based on the UEs that are in the same plan, or based on frequent communication between UEs. For example, a teacher of one of the children in the trust network may want to reach a UE associated with the parent. In that case, the processor can determine that the incoming communication is not spam because the originator has a history of communication with another UE, namely the child UE, in the trust network. The processor can display, on the receiver UE, the information indicating frequency of communication and/or the last known communication between the originator UE and the other UE, i.e., the child UE, in the trust network.

The processor can determine urgency based on a region from which the communication is placed, and the last known location of a device associated with a UE in the trust network. The user can decide to answer the phone by receiving the above location information. Even if the message is not urgent, but the targeted UE is not responding, the processor can forward the message to a second UE in the trust network. For example, the targeted UE can specify that the second UE should be contacted if the target UE is not responding.

Specifically, the processor can create a trust network of multiple UEs including a first UE and the second UE, where the first UE is the receiver UE. The processor can obtain an indication that the communication is urgent. Upon determining that the communication is the valid communication and obtaining the indication that the communication is urgent, the processor can modify an audio alert or a video alert associated with the first UE to indicate that the communication is urgent. Upon determining that the communication is the spam communication, the processor can obtain a geographical region associated with the originator UE, and a geographical region associated with the second UE. The processor can determine whether the geographical region associated with the originator UE and the geographical region associated with the second UE overlap. Upon determining that the geographical region associated with the first UE and the geographical region associated with the second UE overlap, the processor can modify an audio alert or a video alert associated with the first UE to indicate that the communication is urgent. If there is no overlap, the processor can determine that the call is spam. The processor can modify the phone ring or display based on the urgency, and the trust level of the originator within the trust network.

The processor can obtain from a CNAM database a character string greater than fifteen characters, for example a thirty-character string, indicating a caller name associated with the originator UE and an indication of likelihood that the call is the spam communication based on a communication history associated with the originator UE.

The communication can include an email. To obtain the profile information associated with the originator UE, the processor can obtain from an ENAM database a character string indicating a name associated with the originator UE and an indication of likelihood that the email is the spam communication based on a communication history associated with the originator UE.

To determine whether the communication is the spam communication or the valid communication, the processor can consider frequency of communication between the two UEs, and a region associated with the originator UE. For example, if the receiver UE never received a call from the region associated with the originator UE, the processor can determine that the communication is spam.

Specifically, based on the communication history associated with the receiver UE, the processor can determine a frequency of communication between the originator UE and the receiver UE. Upon determining that the frequency of communication between the originator UE and the receiver UE is below a first threshold, e.g., less than one, the processor can increase the likelihood that the communication is the spam communication. Based on the region associated with the originator UE, the processor can determine a frequency of communication between the region and the receiver UE. Upon determining that the frequency of communication between the region and the receiver UE is below a second threshold, e.g., zero, the processor can increase the likelihood that the communication is the spam communication. Based on the calendar entry associated with the receiver UE and the name associated with the originator UE, the processor can determine whether the name associated with the originator UE corresponds to the calendar entry. For example, the calendar entry can indicate an upcoming appointment at the doctor's office, and the processor can determine whether the originator UE is an assistant at the doctor's office. Upon determining that the name associated with the originator UE corresponds to the calendar entry, the processor can decrease the likelihood that the communication is the spam communication. The processor can determine that the communication is the spam communication by comparing the likelihood that the communication is the spam communication to a third threshold. For example, if the likelihood that the communication is the spam communication is above 0.7, then the processor can determine that the communication is spam.

Computer System

Figure 8:
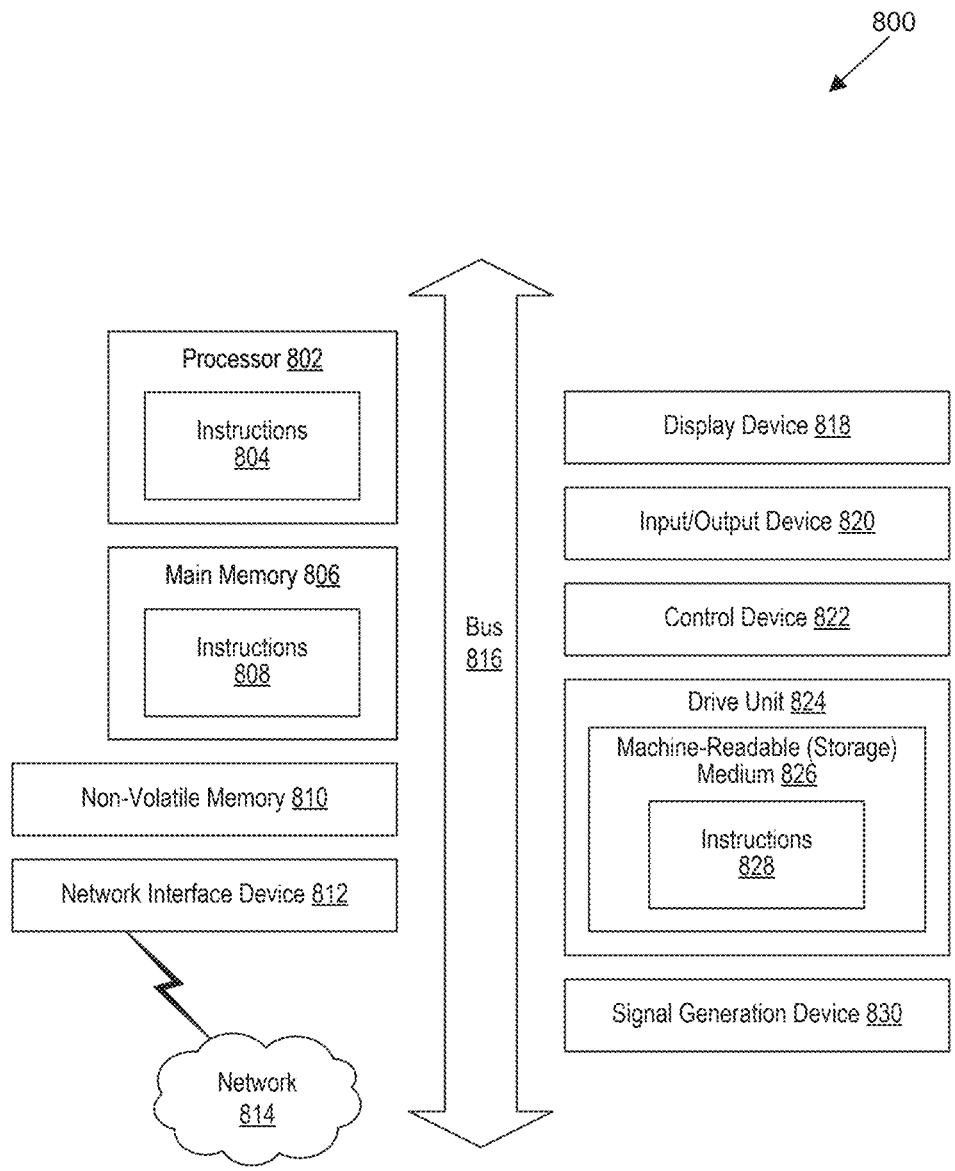
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the Figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions, when executed by at least one data processor of a system, cause the system to:
receive a request for a communication from an originator mobile device operating on a wireless telecommunication network,
wherein the request for the communication includes a unique identifier associated with the originator mobile device and a unique identifier associated with a receiver mobile device operating on the wireless telecommunication network;
based on the unique identifier associated with the originator mobile device, obtain profile information associated with the originator mobile device including a name associated with the originator mobile device and a region associated with the originator mobile device;
based on the unique identifier associated with the receiver mobile device, obtain profile information associated with the receiver mobile device including a communication history associated with the receiver mobile device and a calendar entry associated with the receiver mobile device;
based on the profile information associated with the originator mobile device and the profile information associated with the receiver mobile device, determine whether the communication is a spam communication or a valid communication;
upon determining that the communication is the valid communication, route the communication to the originator mobile device, and
provide at least a portion of the profile information associated with the originator mobile device to the receiver mobile device;
upon determining that the communication is the spam communication, indicate to the receiver mobile device that there is an incoming communication that is likely the spam communication; and
store the unique identifier associated with the originator mobile device and the determination of whether the communication is the spam communication or the valid communication in a database.

2. The non-transitory, computer-readable storage medium of claim 1, comprising instructions to:
create a trust network of multiple mobile devices including a first mobile device and a second mobile device;
receive the communication indicating a first unique identifier associated with the first mobile device;
obtain profile information associated with the first mobile device including a communication history associated with the first mobile device, a calendar entry associated with the first mobile device, and a phone book associated with the first mobile device;
based on the profile information associated with the originator mobile device and the profile information associated with the first mobile device, determine whether the communication is the spam communication or the valid communication; and
upon determining that the communication is the valid communication based on the profile information associated with the first mobile device,
route the communication to the second mobile device, thereby enabling the second mobile device to receive the valid communication directed to the first mobile device.

3. The non-transitory, computer-readable storage medium of claim 1, comprising instructions to:
create a trust network of multiple mobile devices including a first mobile device and a second mobile device;
receive the communication indicating a first unique identifier associated with the first mobile device;
obtain profile information associated with the first mobile device including a communication history associated with the first mobile device, a calendar entry associated with the first mobile device, and a phone book associated with the first mobile device;
based on the profile information associated with the originator mobile device and the profile information associated with the first mobile device, determine whether the communication is the spam communication or the valid communication; and
upon determining that the communication is the valid communication based on the profile information associated with the first mobile device,
route the communication to the second mobile device, thereby enabling the second mobile device to receive the valid communication directed to the first mobile device, and
provide information to the second mobile device indicating that the receiver mobile device is the first mobile device.

4. The non-transitory, computer-readable storage medium of claim 1, comprising instructions to:
create a trust network of multiple mobile devices including a first mobile device and a second mobile device,
wherein the first mobile device is the receiver mobile device;
obtain an indication that the communication is urgent;
upon determining that the communication is the valid communication and obtaining the indication that the communication is urgent, modify an audio alert or a video alert associated with the first mobile device to indicate that the communication is urgent;
upon determining that the communication is the spam communication, obtain a geographical region associated with the originator mobile device and a geographical region associated with the second mobile device;
determine whether the geographical region associated with the originator mobile device and the geographical region associated with the second mobile device overlap; and
upon determining that the geographical region associated with the first mobile device and the geographical region associated with the second mobile device overlap, modify the audio alert or the video alert associated with the first mobile device to indicate that the communication is urgent.

5. The non-transitory, computer-readable storage medium of claim 1, wherein the communication includes a call, and wherein the instructions to obtain the profile information associated with the originator mobile device comprise instructions to:
obtain from a caller name (CNAM) database a character string greater than fifteen characters, indicating a caller name associated with the originator mobile device and an indication of likelihood that the call is the spam communication based on a communication history associated with the originator mobile device.

6. The non-transitory, computer-readable storage medium of claim 1, wherein the communication includes an email, and wherein the instructions to obtain the profile information associated with the originator mobile device comprise instructions to:
   obtain from an email name (ENAM) database a character string indicating a name associated with the originator mobile device and an indication of likelihood that the email is the spam communication based on a communication history associated with the originator mobile device.

7. The non-transitory, computer-readable storage medium of claim 1, wherein the instructions to determine whether the communication is the spam communication or the valid communication include instructions to:
   based on the communication history associated with the receiver mobile device, determine a frequency of communication between the originator mobile device and the receiver mobile device;
   upon determining that the frequency of communication between the originator mobile device and the receiver mobile device is below a first threshold, increase a likelihood that the communication is the spam communication;
   based on the region associated with the originator mobile device, determine a frequency of communication between the region and the receiver mobile device;
   upon determining that the frequency of communication between the region and the receiver mobile device is below a second threshold, increase the likelihood that the communication is the spam communication;
   based on the calendar entry associated with the receiver mobile device and the name associated with the originator mobile device, determine whether the name associated with the originator mobile device corresponds to the calendar entry;
   upon determining that the name associated with the originator mobile device corresponds to the calendar entry, decrease the likelihood that the communication is the spam communication; and
   determine that the communication is the spam communication by comparing the likelihood that the communication is the spam communication to a third threshold.

8. A method comprising:
   receiving a request for a communication from an originator UE operating on a wireless telecommunication network,
      wherein the request for the communication includes a unique identifier associated with the originator UE and a unique identifier associated with a receiver UE operating on the wireless telecommunication network;
   based on the unique identifier associated with the originator UE, obtaining profile information associated with the originator UE including a name associated with the originator UE or a region associated with the originator UE;
   based on the unique identifier associated with the receiver UE, obtaining profile information associated with the receiver UE including a communication history associated with the receiver UE or a calendar entry associated with the receiver UE;
   based on the profile information associated with the originator UE and the profile information associated with the receiver UE, determining whether the communication is a spam communication or a valid communication;
   upon determining that the communication is the valid communication, routing the communication to the originator UE;
   upon determining that the communication is the spam communication, indicating to the receiver UE that there is an incoming communication that is likely the spam communication; and
   storing the unique identifier associated with the originator UE and the determination of whether the communication is the spam communication or the valid communication in a database.

9. The method of claim 8, comprising:
   creating a trust network of multiple UEs including a first UE and a second UE;
   receiving the communication indicating a first unique identifier associated with the first UE;
   obtaining profile information associated with the first UE including a communication history associated with the first UE, a calendar entry associated with the first UE, and a phone book associated with the first UE;
   based on the profile information associated with the originator UE and the profile information associated with the first UE, determining whether the communication is the spam communication or the valid communication; and
   upon determining that the communication is the valid communication based on the profile information associated with the first UE,
      routing the communication to the second UE, thereby enabling the second UE to receive the valid communication directed to the first UE.

10. The method of claim 8, comprising:
   creating a trust network of multiple UEs including a first UE and a second UE;
   receiving the communication indicating a first unique identifier associated with the first UE;
   obtaining profile information associated with the first UE including a communication history associated with the first UE, a calendar entry associated with the first UE, and a phone book associated with the first UE;
   based on the profile information associated with the originator UE and the profile information associated with the first UE, determining whether the communication is the spam communication or the valid communication; and
   upon determining that the communication is the valid communication based on the profile information associated with the first UE,
      routing the communication to the second UE, thereby enabling the second UE to receive the valid communication directed to the first UE, and
      providing information to the second UE indicating that the receiver UE is the first UE.

11. The method of claim 8, comprising:
   creating a trust network of multiple UEs including a first UE and a second UE, wherein the first UE is the receiver UE;
   obtaining an indication that the communication is urgent;
   upon determining that the communication is the valid communication and obtaining the indication that the communication is urgent, modifying an audio alert or a video alert associated with the first UE to indicate that the communication is urgent;

upon determining that the communication is the spam communication, obtaining a geographical region associated with the originator UE and a geographical region associated with the second UE;

determining whether the geographical region associated with the originator UE and the geographical region associated with the second UE overlap; and upon determining that the geographical region associated with the first UE and the geographical region associated with the second UE overlap, modifying the audio alert or the video alert associated with the first UE to indicate that the communication is urgent.

12. The method of claim 8, wherein the communication includes a call, and wherein obtaining the profile information associated with the originator UE comprises:

obtaining from a caller name (CNAM) database a character string greater than fifteen characters, indicating a caller name associated with the originator UE and an indication of likelihood that the call is the spam communication based on a communication history associated with the originator UE.

13. The method of claim 8, wherein determining whether the communication is the spam communication or the valid communication comprises:

based on the communication history associated with the receiver UE, determining a frequency of communication between the originator UE and the receiver UE;

upon determining that the frequency of communication between the originator UE and the receiver UE is below a first threshold, increasing a likelihood that the communication is the spam communication;

based on the region associated with the originator UE, determining a frequency of communication between the region and the receiver UE;

upon determining that the frequency of communication between the region and the receiver UE is below a second threshold, increasing the likelihood that the communication is the spam communication;

based on the calendar entry associated with the receiver UE and the name associated with the originator UE, determining whether the name associated with the originator UE corresponds to the calendar entry;

upon determining that the name associated with the originator UE corresponds to the calendar entry, decreasing the likelihood that the communication is the spam communication; and determining that the communication is the spam communication by comparing the likelihood that the communication is the spam communication to a third threshold.

14. A system comprising:

at least one hardware processor; and at least one non-transitory memory storing instructions, which, when executed by the at least one hardware processor, cause the system to:

receive a request for a communication from an originator UE operating on a wireless telecommunication network, wherein the request for the communication includes a unique identifier associated with the originator UE and a unique identifier associated with a receiver UE operating on the wireless telecommunication network;

based on the unique identifier associated with the originator UE, obtain profile information associated with the originator UE including a name associated with the originator UE or a region associated with the originator UE;

based on the unique identifier associated with the receiver UE, obtain profile information associated with the receiver UE including a communication history associated with the receiver UE or a calendar entry associated with the receiver UE;

based on the profile information associated with the originator UE and the profile information associated with the receiver UE, determine whether the communication is a spam communication or a valid communication;

upon determining that the communication is the valid communication, route the communication to the originator UE;

upon determining that the communication is the spam communication, indicate to the receiver UE that there is an incoming communication that is likely the spam communication; and store the unique identifier associated with the originator UE and the determination of whether the communication is the spam communication or the valid communication in a database.

15. The system of claim 14, comprising instructions to:

create a trust network of multiple UEs including a first UE and a second UE;

receive the communication indicating a first unique identifier associated with the first UE;

obtain profile information associated with the first UE including a communication history associated with the first UE, a calendar entry associated with the first UE, and a phone book associated with the first UE;

based on the profile information associated with the originator UE and the profile information associated with the first UE, determine whether the communication is the spam communication or the valid communication; and upon determining that the communication is the valid communication based on the profile information associated with the first UE, route the communication to the second UE, thereby enabling the second UE to receive the valid communication directed to the first UE.

16. The system of claim 14, comprising instructions to:

create a trust network of multiple UEs including a first UE and a second UE;

receive the communication indicating a first unique identifier associated with the first UE;

obtain profile information associated with the first UE including a communication history associated with the first UE, a calendar entry associated with the first UE, and a phone book associated with the first UE;

based on the profile information associated with the originator UE and the profile information associated with the first UE, determine whether the communication is the spam communication or the valid communication; and upon determining that the communication is the valid communication based on the profile information associated with the first UE, route the communication to the second UE, thereby enabling the second UE to receive the valid communication directed to the first UE, and provide information to the second UE indicating that the receiver UE is the first UE.

17. The system of claim 14, comprising instructions to:
create a trust network of multiple UEs including a first UE and a second UE, wherein the first UE is the receiver UE;
obtain an indication that the communication is urgent;
upon determining that the communication is the valid communication and obtaining the indication that the communication is urgent, modify an audio alert or a video alert associated with the first UE to indicate that the communication is urgent;
upon determining that the communication is the spam communication, obtain a geographical region associated with the originator UE and a geographical region associated with the second UE;
determine whether the geographical region associated with the originator UE and the geographical region associated with the second UE overlap; and
upon determining that the geographical region associated with the first UE and the geographical region associated with the second UE overlap, modify the audio alert or the video alert associated with the first UE to indicate that the communication is urgent.

18. The system of claim 14, wherein the communication includes a call, and wherein the instructions to obtain the profile information associated with the originator UE comprise instructions to:
obtain from a caller name (CNAM) database a character string greater than fifteen characters, indicating a caller name associated with the originator UE and an indication of likelihood that the call is the spam communication based on a communication history associated with the originator UE.

19. The system of claim 14, wherein the communication includes an email, and wherein the instructions to obtain the profile information associated with the originator UE comprise instructions to:
obtain from an ENAM database a character string indicating a name associated with the originator UE and an indication of likelihood that the email is the spam communication based on a communication history associated with the originator UE.

20. The system of claim 14, wherein the instructions to determine whether the communication is the spam communication or the valid communication include instructions to:
based on the communication history associated with the receiver UE, determine a frequency of communication between the originator UE and the receiver UE;
upon determining that the frequency of communication between the originator UE and the receiver UE is below a first threshold, increase a likelihood that the communication is the spam communication;
based on the region associated with the originator UE, determine a frequency of communication between the region and the receiver UE;
upon determining that the frequency of communication between the region and the receiver UE is below a second threshold, increase the likelihood that the communication is the spam communication;
based on the calendar entry associated with the receiver UE and the name associated with the originator UE, determine whether the name associated with the originator UE corresponds to the calendar entry;
upon determining that the name associated with the originator UE corresponds to the calendar entry, decrease the likelihood that the communication is the spam communication; and
determine that the communication is the spam communication by comparing the likelihood that the communication is the spam communication to a third threshold.

* * * * *